United States Patent [19]
Elliott

[11] 4,345,239
[45] Aug. 17, 1982

[54] APPARATUS FOR DETERMINING PEN ACCELERATION

[75] Inventor: Brian J. Elliott, Yorktown Heights, N.Y.

[73] Assignee: International Business Machines Corporation, Armonk, N.Y.

[21] Appl. No.: 161,483

[22] Filed: Jun. 20, 1980

[51] Int. Cl.$^3$ .............................................. G06K 9/22
[52] U.S. Cl. .............................. 340/146.3 SY; 178/19
[58] Field of Search .................... 340/146.3 SY, 825.3, 340/825.31, 825.34; 178/18, 19; 324/446–449, 71 R, 72.5, 158 P; 235/451, 472; 361/290, 291; 73/432 R, 862.52

[56] References Cited

U.S. PATENT DOCUMENTS

| | | | |
|---|---|---|---|
| 3,962,679 | 6/1976 | Engelbrecht | 178/18 |
| 4,034,155 | 7/1977 | Muller et al. | 340/146.3 SY |
| 4,078,226 | 3/1978 | Eernisse et al. | 340/146.3 SY |
| 4,128,829 | 12/1978 | Herbst et al. | 340/146.3 SY |
| 4,131,880 | 12/1978 | Siy et al. | 340/146.3 SY |
| 4,142,175 | 2/1979 | Herbst et al. | 73/432 R |
| 4,158,747 | 6/1979 | Muller et al. | 340/146.3 SY |

OTHER PUBLICATIONS

Dymetal "Dual—Level Pen For Capacitive Sensing of Tablet Signals", *IBM Tech. Disclosure Bulletin*, vol. 17, No. 2, Jul. 1974, pp. 572–574.

Herbst et al., "Signature Verification Based on Complete Accelerometry", *IBM Tech. Disclosure Bulletin*, vol. 19, No. 12, May 1977, pp. 4827–4828.

Larsen, "Quadrant Check For Signature Verification", *IBM Tech. Disclosure Bulletin*, vol. 20, No. 4, Sep. 1977, pp. 1538–1539.

Lew, "Optimal Designs of Instrumented Pens For Signature Verification", *IBM Tech. Disclosure Bulletin*, vol. 21, No. 8, Jan. 1979, pp. 3415–3419.

*Primary Examiner*—Leo H. Boudreau
*Attorney, Agent, or Firm*—Pollock, Vande Sande & Priddy

[57] ABSTRACT

An apparatus for determining pen acceleration for use in a signature vertification system. Capacitive transducer means are mounted in a pen, and change capacitance by an amount which is proportional to pen acceleration. A Blumlein bridge circuit is utilized to measure changes in the capacitance of the transducer means, and the output of the bridge is amplified and demodulated to result in a signal which is proportional to acceleration.

5 Claims, 4 Drawing Figures

APPARATUS FOR DETERMINING PEN ACCELERATION

FIELD OF THE INVENTION

The present invention relates to signature verification systems, and more particularly to an apparatus for measuring pen acceleration for use in such systems.

BACKGROUND OF THE INVENTION

In recent years, there has been increasing interest in signature verification type security systems for providing access to individuals to either secured areas or more commonly to data banks and associated processors, on the basis of the individual's signature as executed at a pre-designated place with a specially provided pen.

One such system which has been found to provide advantageous results is disclosed in Herbst et al. U.S. Pat. No. 3,983,535, and is based on the discovery that when an individual signs his name, certain acceleration components are imparted to the pen, for example in the x and y directions, and that such acceleration components are repeated with each signature by the same individual, and may be the basis for identifying that individual's signature. In Herbst et al. U.S. Pat. No. 4,128,829 both pen acceleration and pen stylus pressure on the writing surface are used to identify signatures. In the particular system disclosed in that patent the sampled accelerations and pressure values are first segmented and are then correlated with corresponding segments of a reference signature. Successive comparisons are performed utilizing successive shifting of the phases between the segments being correlated to find regions of highest possible correlation. A running account of maximum cross correlation values is kept and the maximum values for each segment pair comparison are combined, with the resultant correlation value being utilized as a verification indicator.

It is evident that signature verification systems such as described above must include some means of determining pen acceleration. Since the acceleration imparted to the pen is proportional to the muscle forces which are exerted by the signer, one type of apparatus which has been utilized is the combination of a strain gauge transducer mounted in the pen and a resistance bridge. However, strain gauge devices have the disadvantage of generally being quite expensive, and also are difficult to mount and may be easily damaged by impact or excessive pressure.

Another type of transducer which has been utilized is the piezoelectric type, e.g., see U.S. Pat. No. 4,078,226. Piezoelectric transducers generate a signal upon being compressed and such signal may be used as a measure of the muscle forces which are exerted on the pen. However, problems involving variations in cable capacitance, and leakage, have made piezoelectric transducers difficult to use.

Herbst et al. U.S. Pat. No. 3,983,535 mentioned above suggests the use of a commercially available tablet device which produces analog signals proportional to x-y displacement. However, since it is necessary to provide an apparatus for generating the second derivative of the displacement output signal to obtain acceleration, such devices may be unduly complex.

SUMMARY OF THE INVENTION

It is therefore an object of the invention to provide an improved apparatus for determining pen acceleration for use in a signature verification system.

It is a further object of the invention to provide an improved apparatus for determining pen stylus pressure for use in a signature verification system.

It is a further object of the invention to provide an apparatus for determining pen acceleration which utilizes an acceleration transducer which is rugged and durable.

It is still a further object of the invention to provide an apparatus for determining pen acceleration which is insensitive to changes in stray capacitance in the pen itself, and in particular in the cables.

The above objects are accomplished by providing capacitive transducer means for measuring pen acceleration and utilizing a Blumlein bridge circuit to measure the change in capacitance of the transducer means. The transducer capacitance is arranged to be one leg of the Blumlein bridge circuit and the output of the bridge is a small A.C. signal wherein the modulation is proportional to pen acceleration. The signal is amplified and demodulated to provide a signal indicative of acceleration, which is fed to the signature verification system processing apparatus.

If desired, a capacitive transducer means may also be mounted in the pen so as to change capacitance in response to stylus pressure, and in this case the pressure signal is obtained in the same way as the acceleration signal described above.

In accordance with the invention, the present apparatus is insensitive to changes in stray capacitance and to changes in the capacitances of the coaxial cables which connect the transducer means to the rest of the system. This is an extremely important property of the present invention, as with ordinary use of the pen, the cable capacitances will change with positioning, bending, etc. and if the system is not totally insensitive to such changes, the relatively small change in capacitance which is indicative of acceleration will become obscured.

The invention will be better understood by referring to the accompanying drawings, in which:

DETAILED DESCRIPTION OF THE PREFERRED EMBODIMENTS

Figure 1:
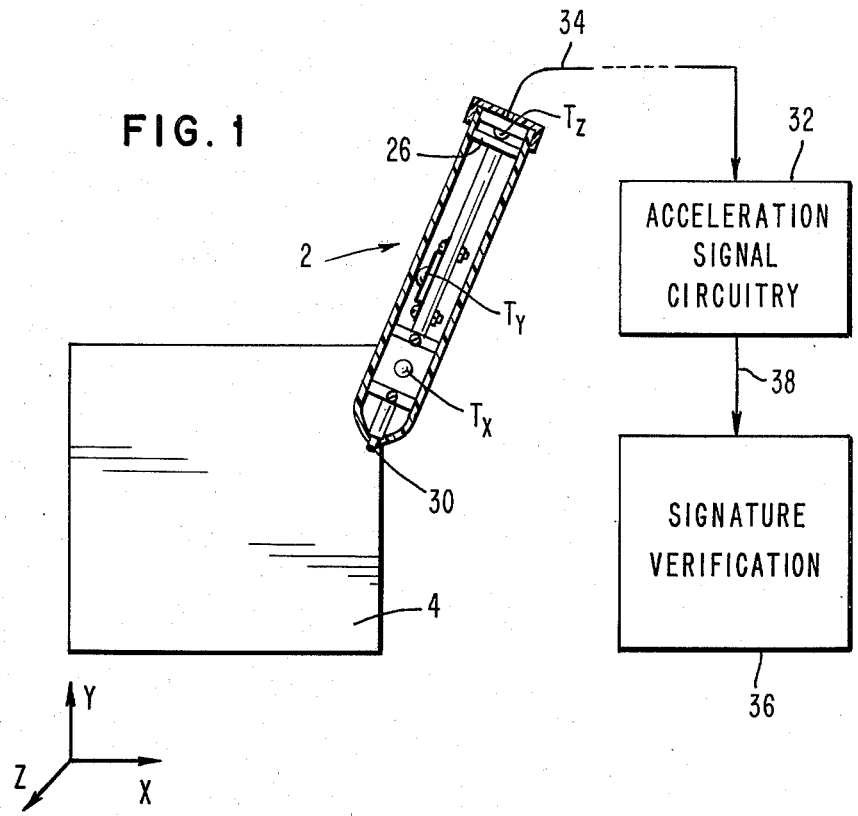
FIG. 1 is a schematic representation of an overview of an apparatus in accordance with the present invention.

Referring to FIG. 1, which is an overview of an apparatus in accordance with the present invention pen 2 is provided for writing on tablet 4. As mentioned above, the pen and tablet would ordinarily be provided at a pre-designated place where an individual desiring to gain access to a data bank or a secured area would sign his name.

While the word "pen" is used throughout the specification and claims, it is to be understood that this word is to be construed as covering any type of writing or marking implement, rather than being limited to an implement which writes with ink.

In accordance with the present invention, capacitive transducer means is or are mounted in pen 2 to respond to changes in acceleration of the pen, and also to changes in pressure if desired. While it is generally known to use capacitive transducers to measure acceleration, it is not believed that such means have been successfully used in signature verification applications before the present invention.

Figure 2:
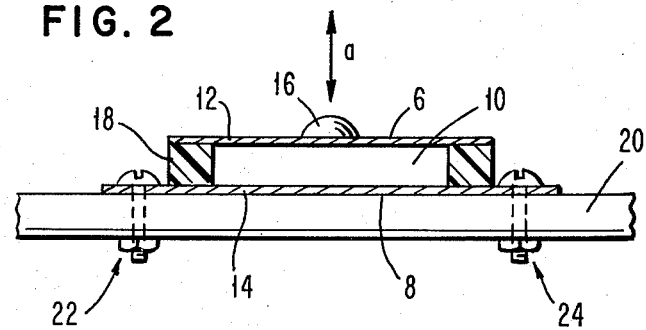
FIG. 2 is a schematic representation of an embodiment of a capacitive transducer means which may be utilized in the present invention.

One embodiment of a suitable capacitive transducer means is depicted in FIG. 2, and is seen to comprise charge storing surfaces 6 and 8 which are separated by dielectric 10. The charge storing surfaces would typically be the outside-facing surfaces of a pair of metallic plates 12 and 14 or could be metallic foil mounted on metallic or non-metallic plates 12 and 14, while the dielectric is preferably air, but possibly also could be an elastomer or other substance. While the plates of the capacitor could be made of a variety of specific materials, a preferred material for the movable plate is phosphor-bronze.

Mass 16 is mounted on top of the plate 6, which is arranged to be of suitable compliance for achieving a desired resonant frequency. The plate vibrates when force components perpendicular thereto are applied, and for frequencies well below resonance the system is compliance-controlled. The transducer has an "at-rest" capacitance $C_o$, and for small displacements compared with the mean plate spacing, the change in capacitance $\Delta C$ is proportional to the acceleration component perpendicular to the plates. If desired, the system could include the use of damping material 18 between the plates, as shown in FIG. 2.

An exemplary transducer might have charge storing surfaces of 3 mm on a side and a plate spacing of 0.5 mm. The resonant frequency of such a transducer might be designed to be 100 or 200 Hz, as in signature work typical peak acceleration values reach 2 g, with Fourier components of up to 40 Hz. For a small capacitive transducer as described, the typical expected change in capacitance during signature execution would be $\Delta C = 10^{-3}$ to $10^{-2}$ pF.

The transducer means may be mounted within the body of the pen by any mechanical mounting expedient known to those skilled in the art, and to a certain extent the specific mounting means used will depend on the particular pen structure which is utilized. The only requirement is that the stationary capacitor plate be mounted to a rigid member which is stationary with respect to the pen body, and in FIG. 2, plate 14 is seen to be mounted to rigid, stationary, plate 20 by nut and bolt assemblies 22 and 24.

It frequently is most useful to measure acceleration components in both the x and y directions of the writing tablet, with y information perhaps being the most useful. Therefore, as is shown schematically in FIG. 1, one transducer or capacitance-changing element $T_x$ is mounted so that it faces the x direction during pen use, while another transducer or capacitance-changing element $T_y$ is mounted so that it faces the y direction during such use. If desired, a third capacitance-changing element $T_z$ is used to measure pen point pressure and is arranged to be activated through intermediary means 26, which is merely mechanical means of a known type for transmitting pen point pressure to the movable plate of the capacitance changing-element.

It should be noted that while a particular type of capacitive transducer means is illustrated in FIG. 2, other types may be used, and are within the scope of the invention. For example, in a slightly different parallel plate structure, instead of being supported on two sides as shown in FIG. 2, top plate 12 might only be supported on one side.

When an individual signs his name with pen 2, stylus 30 may cause the signature to appear on tablet 4 in the usual manner. At the same time, due to the acceleration and pressure variations imparted to the capacitive transducers, corresponding changes in capacitance are transmitted to acceleration signal-providing circuitry 32 over cable 34. While cable 34 is shown as a single line for purposes of illustration, it would actually be a number of coaxial cables. Acceleration signal-providing circuitry 32 provides electrical signals proportional to acceleration, and pressure also if desired, to the remainder of the signature verification system 35, which processes the acceleration information and decides whether or not the signature is authentic or counterfeit.

Figure 3:
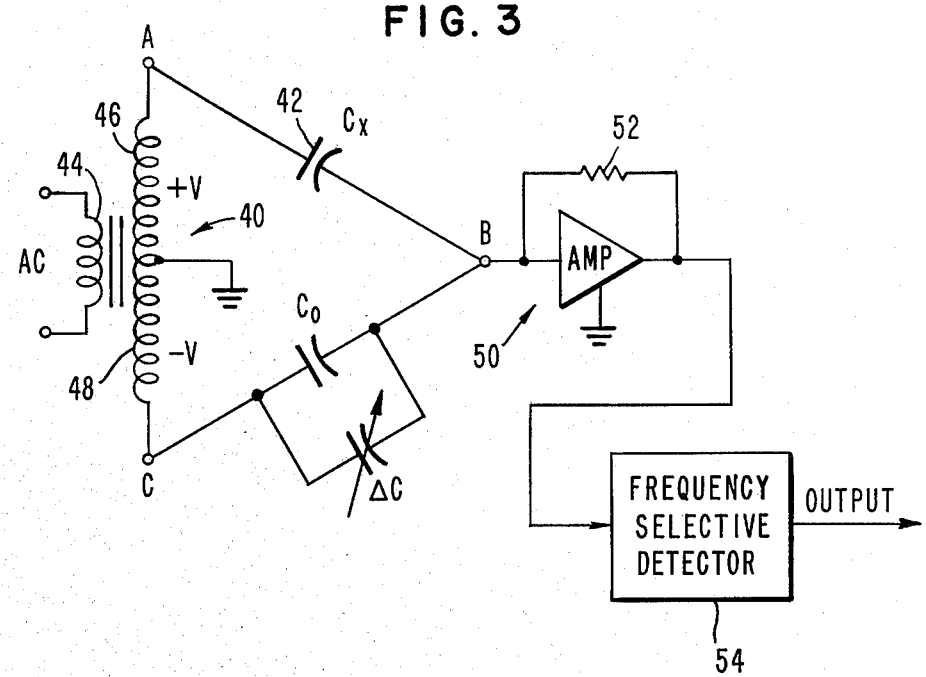
FIG. 3 is a diagram of the acceleration signal-providing circuitry shown in FIG. 1, including a schematic diagram of the Blumlein bridge circuit.

In accordance with a feature of the invention, the change in capacitance of the transducer means is measured by a Blumlein bridge circuit. Such a circuit, which is known in the electrical arts, is shown in FIG. 3, and is seen to include Blumlein equal ratio transformer 40, balance capacitor 42 of capacitance $C_x$ and the capacitance of the acceleration transducer which is comprised of the "at rest" capacitance $C_o$ and the change in capacitance due to acceleration $\Delta C$. The four "arms" of the bridge are comprised of secondary winding 46, secondary winding 48, capacitor 42, and the transducer capacitance $C_o + \Delta C$ respectively, and an A.C. input is fed to transformer primary winding 44.

The equal ratio transformer 40 provides equal but oppositely directed secondary voltages $+V$ and $-V$. In the operation of the bridge, when the capacitance of the balance capacitor $C_x$, and the transducer "at-rest" capacitance $C_o$ are equal the bridge is balanced and the current between points B and D of the bridge is zero. However, when the pen is accelerated and the $\Delta C$ component of the transducer capacitance is added to $C_o$, the current into node B becomes $V\omega\Delta C$ where V is the voltage of one of the secondary windings and $\omega$ is the frequency of this voltage. Thus, the magnitude of the current into node B is proportional to the change in capacitance $\Delta C$, which in turn is proportional to acceleration.

For successful operation of the circuit, equal ratio transformer 40 must have an extremely low leakage inductance, or otherwise changes in stray capacitance will cause errors. To avoid problems with leakage reactance, the Blumlein bridge circuit utilizes a trifilar wound transformer wherein three insulated wires of equal length, one for the primary, two for the secondaries, which make up the primary winding 44, and secondary windings 46 and 48 respectively are interwound with each other before being wound on the transformer core. The tight coupling between windings ensures that equal secondary voltages are afforded even at high frequencies.

A salient advantage of the present invention is that it provides an arrangement which is insensitive to changes in stray capacitance and cable capacitance, and continues to provide accurate acceleration signals notwithstanding such changes. Because of the tight coupling provided by the trifilar wound transformer any change in stray or cable capacitance which appears across one of the secondary windings is reflected equally into the primary winding and is then reflected into the other secondary winding, so that the change in capacitance has no net effect on the circuit.

Figure 4:
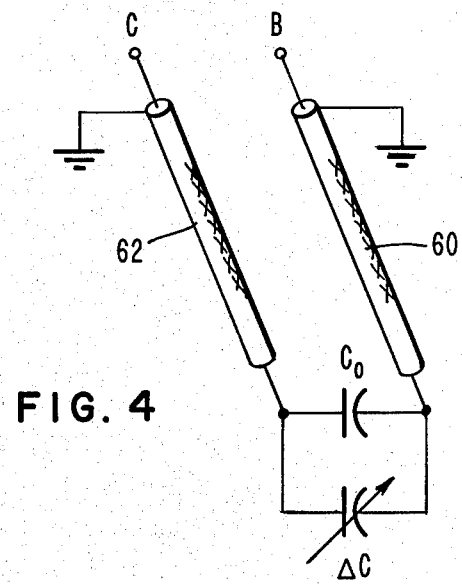
FIG. 4 is a schematic representation of coaxial cables which connect the capacitive transducer means to the acceleration signal-providing circuitry.

This is an extremely important feature of the present invention, as problems with cable capacitance have plagued some prior art efforts to effectively measure acceleration. FIG. 4 illustrates a pair of coaxial cables 60 and 62 which are connected between the capacitive transducer and points B and C of the bridge. During ordinary usage of the pen, changes in position of the coaxial cables and bending thereof may cause changes in cable capacitance, so it is easy to see how the accuracy of any circuit which is not insensitive to such changes will be adversely affected.

Referring to FIG. 3 again, the bridge output signal is fed into wideband operational amplifier 50 having feedback resistor 52 which is chosen suitably to allow efficient gain. The voltage output of the operational amplifier is $V\omega \Delta CR$ where R is the resistance of resistor 52. It is seen that with possible values of $V=10$ V., $\omega=10^6$ rad/sec, $\Delta C=10^{-12}$ F and $R=10^5$ ohms, a 10 mv. output is obtained.

Since the output of operational amplifier 50 is a varying acceleration signal modulating a higher frequency A.C. signal of frequency $\omega$, a detection capability must be included. In this respect, frequency selective detector 54 is provided which may be an A.M. detector of conventional design. The output of detector 54 is the acceleration signal which is inputted to the remainder of the signature verification system.

When three transducers $T_x$, $T_y$, $T_z$ such as is illustrated in FIG. 1 are used, it is feasible to still use only one bridge transformer, with separate balancing capacitors, current amplifiers, and detectors for each of the components.

Thus, an improved apparatus for measuring pen acceleration has been provided.

It is to be understood that the term "Blumlein bridge circuit" as used in the appended claims is to be construed as meaning a circuit comprised of a trifilar wound equal ratio transformer, a balance capacitor and an unknown capacitance wherein an A.C. input is connected to the primary of the transformer and wherein the four arms of the bridge are respectively comprised of, one secondary winding of the transformer, the other secondary winding of the transformer, the balance capacitor, and the unknown capacitance.

Further, it should be understood that while I have described certain embodiments of the invention, I do not intend to be restricted thereto, but rather intend to cover all variations and modifications which come within the spirit of the invention, which is limited only by the claims which are appended hereto.

Having thus described my invention, what I claim as new, and desire to secure by Letters Patent is:

1. An apparatus for measuring pen acceleration for use in a signature verification system, comprising:
   a pen having capacitive transducer means mounted therein for changing capacitance responsive to acceleration of said pen,
   a Blumlein bridge circuit having an input and an output and having one arm thereof comprised of the capacitance of said capacitive transducer means,
   amplifier means having an input connected to the output of said Blumlein bridge circuit, and having an output for providing an amplified signal, and
   A.M. detector means for detecting the modulation on said amplified signal, which corresponds to said acceleration.

2. The apparatus of claim 1, wherein said capacitive transducer means in said pen is connected to the remainder of said Blumlein bridge circuit by coaxial cable.

3. The apparatus of claim 2, wherein said capacitive transducer means includes a capacitance-changing element comprised of a pair of spaced-apart parallel plates, each of which has a charge storing surface, a first of said plates being fixed to said pen, and the second of said plates being supported by or being part of a compliant arm having a mass thereon, said second plate being displaced upon pen acceleration by a distance which is proportional to the component of such acceleration in the direction perpendicular to said plate surfaces.

4. The apparatus of claim 4, wherein said signature verification system defines x and y directions, and wherein said capacitive transducer means includes two of said capacitance-changing elements, one of which is mounted with its charge storing surfaces perpendicular to said x direction and the other of which is mounted with its charge storing surfaces perpendicular to said y direction.

5. The apparatus of claim 4, wherein said pen includes a stylus for writing on a writing surface, and further including a third said capacitance-changing element mounted in said pen with respect to said stylus so as to change capacitance when pressure is applied to said stylus by said writing surface during writing.

* * * * *